United States Patent

Robertson et al.

[11] Patent Number: 6,149,722
[45] Date of Patent: Nov. 21, 2000

[54] PHTHALOCYANINE DYES, INKS CONTAINING THE SAME AND USE THEREOF IN INK JET PRINTING

[75] Inventors: Colin Dick Robertson, Grangemouth; Mark Kenworthy, Blackley, both of United Kingdom

[73] Assignee: Zeneca Limited, London, United Kingdom

[21] Appl. No.: 09/240,602

[22] Filed: Feb. 1, 1999

[30] Foreign Application Priority Data

Jun. 23, 2000 [GB] United Kingdom ............ 9813475

[51] Int. Cl.$^7$ .................. C09D 11/02; B05D 1/00; B32B 3/00; C09B 47/04

[52] U.S. Cl. .................. 106/31.49; 106/31.47; 106/31.77; 106/31.78; 427/466; 428/195; 540/123; 540/124; 540/130; 540/131; 540/133; 540/134

[58] Field of Search .................. 106/31.49, 31.47, 106/31.77, 31.78, 410, 412; 427/466; 428/195; 540/123, 124, 130, 131, 133, 134

[56] References Cited

U.S. PATENT DOCUMENTS

| | | | |
|---|---|---|---|
| 3,053,849 | 9/1962 | Clark et al. | 540/133 |
| 3,053,850 | 9/1962 | Clark et al. | 540/133 |
| 3,647,827 | 3/1972 | Sigiyama et al. | 540/131 |
| 3,711,508 | 1/1973 | Groll | 540/134 |
| 4,418,015 | 11/1983 | Schreiner et al. | 540/134 |
| 4,632,703 | 12/1986 | Koike et al. | 106/31.49 |
| 4,952,688 | 8/1990 | Springer | 540/134 |
| 5,279,622 | 1/1994 | Stawitz et al. | 540/123 |
| 5,922,116 | 7/1999 | Mistry et al. | 106/31.49 |
| 5,948,154 | 9/1999 | Hayashi et al. | 106/31.47 |
| 6,007,611 | 12/1999 | Mheidle et al. | 106/31.47 |
| 6,015,454 | 1/2000 | Lacroix et al. | 106/31.49 |
| 6,015,896 | 1/2000 | Mistry et al. | 540/134 |

FOREIGN PATENT DOCUMENTS

| | | |
|---|---|---|
| 0 014 407 | 8/1980 | European Pat. Off. . |
| 0 196 901 | 10/1986 | European Pat. Off. . |
| 0 519 395 A1 | 12/1992 | European Pat. Off. . |
| 0 596 383 A1 | 5/1994 | European Pat. Off. . |
| 0 649 881 A1 | 4/1995 | European Pat. Off. . |
| 0 719 847 | 11/1995 | European Pat. Off. . |
| 838.418 | 12/1938 | France . |
| 1.347.692 | 11/1963 | France . |
| WO 97/13811 | 4/1997 | WIPO . |
| WO 98/49239 | 11/1998 | WIPO . |
| WO 98/49240 | 11/1998 | WIPO . |

OTHER PUBLICATIONS

Patent Abstracts of Japan, vol. 8, No. 118 (c–226) re JP 59030874, Feb. 1984.
Patent Abstract of JP06016982A, Jan. 1994.

*Primary Examiner*—Helene Klemanski
*Attorney, Agent, or Firm*—Pillsbury Madison & Sutro

[57] ABSTRACT

Phthalocyanine compounds of Formula (1) have utility as colorants in inks for ink-jet printing, where Formula (1) represents:

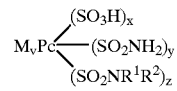

Formula (1)

in which:

M represents a metal or H;

Pc represents a phthalocyanine nucleus; and $R^1$ represents H or $-(CH_2)_nR^3$; $R^2$ represents $(CH_2)_nR^3$; or $R^1$ and $R^2$ together with the nitrogen atom to which they are attached represent a 5 or 6-membered ring; where:

n is independently an integer from 1 to 30; and $R^3$ is independently a group selected from hydroxy, sulpho, cyano, $-SR^4$, $-CO_2R^5$, $-PO_3H_2$ and $-NR^6R^7$; where:

$R^4$, $R^5$, $R^6$ and $R^7$ independently represent H, $C_{1-30}$alkyl optionally substituted by one or more groups selected from hydroxy, mercapto, sulpho, carboxy, cyano and $-PO_3H_2$;

v is the valence of Pc divided by the valence of M;

x is from 1.2 to 3.8;

y is from 0.1 to 2.7;

z is from 0.1 to 2.7; and x, y and z satisfy $2 \leq x+y+z \leq 4$.

19 Claims, No Drawings

PHTHALOCYANINE DYES, INKS CONTAINING THE SAME AND USE THEREOF IN INK JET PRINTING

This invention relates to compounds, to ink compositions comprising them and to the use of such inks in ink jet printing ("IJP"). IJP is a non-impact printing technique in which droplets of ink are ejected through a fine nozzle onto a substrate without bringing the nozzle into contact with the substrate.

There are many demanding performance requirements for colorants and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

It is essential that colorants used in IJP have good solubility (preferably in aqueous systems) so they can be dissolved an ink and fired from the ink-jet head without coming out of solution and blocking the nozzle. Yet colorants that have good operability (i.e. high water solubility) are likely to produce prints of poor water fastness due to the same high water solubility. A significant challenge in designing new colorants for IJP is to provide in the same molecule the apparently mutually exclusive properties of good operability for the ink and yet high water fastness for the print. This often requires the synthesis of a colorant molecule of complex structure comprising many different functional groups and such complex molecules can be expensive and difficult to prepare in high yield.

It would be advantageous to provide colorants which overcome some or all of the preceding disadvantages.

Therefore according to the present invention there are provided one or more compounds of Formula (1) and salts thereof:

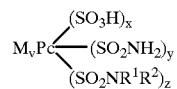

Formula (1)

in which:
M represents a metal or H;
Pc represents a phthalocyanine nucleus; and
$R^1$ represents H or $-(CH_2)_nR^3$; $R^2$ represents $-(CH_2)_nR^3$, or $R^1$ and $R^2$ together with the nitrogen atom to which they are attached represent a 5 or 6-membered ring; where:
  n is independently an integer from 1 to 30; and
  $R^3$ is independently a group selected from H, hydroxy, sulpho, cyano, $-SR^4$, $-CO_2R^5$, $-PO_3H_2$ and $-NR^6R^7$; where:
    $R^4$, $R^5$, $R^6$ and $R^7$ independently represent H, $C_{1-30}$alkyl optionally substituted by one or more groups selected from hydroxy, mercapto, sulpho, carboxy, cyano and $-PO_3H_2$;
v is the valence of Pc divided by the valence of M;
x is from 1.2 to 3.8;
y is from 0.1 to 2.7;
z is from 0.1 to 2.7; and
x, y and z satisfy $2 \leq x+y+z \leq 4$;
  with the provisos that:
  $R^4$ and $R^5$ are other than H;
when $R^1$ is H or $C_{1-4}$alkyl then $R^4$ is other than $C_{1-4}$alkyleneSO$_3$H;
when $R^1$ is H or $C_{1-4}$alkyl and $R^6$ is H, $C_{1-4}$alkyl or hydroxy$C_{1-4}$alkyl; then $R^7$ is other than $C_{1-4}$alkyl, hydroxy$C_{1-4}$alkyl or morpholino; and
when $R^1$ is H or $C_{1-4}$alkyl then $R^6$ and $R^7$ are other than both H or (together with the N atom to which they are attached) other than a morpholino ring.

The applicant has discovered that the above phthalocyanine compounds have particular utility as colorants for use in IJP. Compared to analogues with one or no sulphonic acid groups, the applicant has found compounds of the present invention exhibit improved operational advantages when used in IJP without adversely effecting print water fastness. In addition, compounds of the present invention have other properties which are also useful in IJP. For example they can produce IJ prints which exhibit good optical density, light fastness and/or a particularly attractive cyan shade. Their preparation is straightforward because of their simpler structure.

The compounds of the present invention described herein include all chemical and physical forms thereof (such as those described herein) and incorporate all the above provisos. Preferred compounds are those which are IJP-effective.

When M is a metal it is preferably selected from Li, Na, K, Mg, Ca, Ba, Al, Si, Sn, Pb, Rh, Sc, Ti, V, Cr, Mn, Fe, Co, Ni and Cu, more preferably from Sc, Ti, Va, Cr, Mn, Fe, Co, Zn, Ni and Cu; especially from Ni and Cu, particularly Cu.

It will be appreciated that v (which denotes the stoichiometric ratio of M to Pc) is the molar ratio which produces a stable complex. It can readily be determined from the relative valences of Pc and M (=Pc/M). Thus preferably if Pc is a bivalent radical of formula (2):

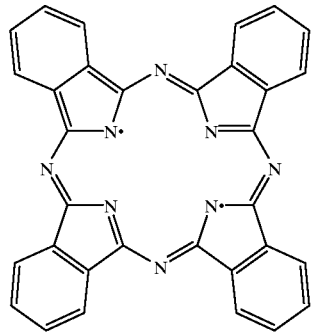

Formula (2)

(i.e the valence of Pc is 2) then v is inverse half the valence of M.

It will also be appreciated that because of the nature of the preparation of compounds of the present invention, in general they may exist as a mixture of different compounds. Thus in Formula (1) the values for v, x, y and z may represent averages for the mixture. Insofar as purification techniques will allow, it is preferred that the mixture comprises one compound as the major component, more preferably the mixture is substantially free of other compounds of Formula (1).

Preferably x is from 1.2 to 2.8, more preferably 1.5 to 2.5, most preferably 1.8 to 2.2, especially 2.0.

Preferably y and z are independently from 0.3 to 2.0, more preferably from 0.5 to 1.5, most preferably 1.0.

When z is >1 (i.e. where there is a plurality of $-SO_2NR^1R^2$ groups attached to the Pc nucleus) each $R^1$ and $R^2$ may independently represent a different substituent in each —$SO_2NR^1R^2$ group.

Most preferred compounds are those in which x is 2, y is 1 and z is 1.

When $R^1$ and/or $R^2$ are —$(CH_2)_nR^3$ then n is independently: preferably from 1 to 15, more preferably from 1 to 8, most preferably from 1 to 4.

When $R^1$, $R^2$ and the N-atom to which they are attached form a cyclic group, it is preferably selected from morpholino, pyridyl or piperidino; more preferably morpholino.

Preferred compounds of Formula (1) are those in which:
M is Cu or Ni,
$R^1$ is selected from H and optionally substituted $C_{1-15}$alkyl; and
$R^2$ is a substituted $C_{1-15}$alkyl.

More preferred compounds of Formula (1) are those in which:
M is Cu,
$R^1$ is selected from H, $C_{1-4}$alkyl and hydroxy$C_{1-4}$alkyl; and
$R^2$ is a hydroxy$C_{1-4}$alkyl.

Specific compounds of Formula (1) are selected from those exemplified herein and any IJP-effective salts thereof, more preferably the alkali metal or optionally substituted ammonium salts thereof.

Any radical group mentioned herein as a substituent refers to a monovalent radical unless otherwise stated. A group which comprises a chain of three or more atoms signifies a group in which the chain may be straight or branched or the chain or any part of the chain may form a ring. Substituents may replace any H attached to an atom in the ring (e.g. Pc nucleus) or chain which is chemically suitable and may be located at any available position on the ring or chain (e.g. $R^3$ can be on any position on the alkyl chain and is not restricted to terminal position). Preferably the substituents on the Pc nucleus are positioned so that none of its phenyl moieties have more than one substituent. The total number of certain atoms is specified herein for certain substituents, for example $C_{1-m}$alkyl, signifies an alkyl group having from 1 to m carbon atoms.

The terms 'optionally substituted' and 'substituted' as used herein, unless immediately followed by a list of one or more substituent groups, means (optionally) substituted with one or more groups selected from: hydroxy, mercapto, carboxy, sulpho and cyano.

Unless the context clearly indicates otherwise, as used herein plural forms of the terms herein are to be construed as including the singular form and vice versa.

The term 'IJP effective' (for example with reference to the inks, compositions, ingredients, substituents and/or compounds described herein) will be understood to mean effective for use in ink-jet printing by for example: providing desirable properties to the ink, being compatible with any inert carriers and/or diluents suitable for formulating such inks, being compatible with ink jet printers and/or capable of being ink-jet printed. In relation to the processes described herein effective compounds are those which will undergo the specified reactions to form the compounds of the present invention. Preferably compounds acceptable for use in IJP are Ames negative.

It will be appreciated compounds of Formula(1) may exist in many different physical and chemical forms which also form part of the present invention. These forms may comprise any of the following (including mixtures thereof and combinations thereof in the same molecular moiety): salts, stereoisomers (e.g. enantiomers, diastereoisomers, geometric isomers, tautomers and/or conformers), zwitterions, polymorphic forms (e.g. phases, crystalline forms, amorphous forms, solid solutions and/or interstitial compounds); complexes (e.g. in addition to the metal Pc complexes described herein, chelates, solvates, hydrates and/or complexes with any other suitable ligand) and/or isotopically substituted forms (optionally radio-active, e.g. used as means for selective imaging of the compounds and/or inks containing them and/or as tools to investigate their mode of action in IJP).

Compounds of Formula (1) may be in the form as shown in the structures herein (i.e. with free sulphonic acid groups) but are preferably in the form of salts. Salts of Formula (1) may be formed from one or more organic and/or inorganic bases and/or acids and compounds of Formula (1) which are acidic and/or basic (for example acid and/or base addition salts). Salts of Formula (1) comprise all IJP-effective salts that may be formed from monovalent and/or multivalent acids and/or bases. Salts of Formula (1) also comprise all enantiomeric salts formed with IJP-effective chiral acids and/or bases and/or any mixtures of enantiomers of such salts (for example racemic mixtures). The dyes may be converted into a salt using known techniques. The present invention comprises all salts of Formula (1) and mixtures thereof, especially those which are IJP-effective.

Preferred salts of Formulae (1) are alkali metal salts (especially lithium, sodium and potassium salts), and optionally substituted ammonium salts (especially salts with ammonia and volatile amines). More preferred salts are those with a cation of formula +$NT_4$ where each T is independently H or optionally substituted alkyl, or two groups represented by T are H or optionally substituted alkyl and the remaining two groups represented by T, together with the N atom to which they are attached, form a 5 or 6 membered ring (preferably a morpholine, pyridine or piperidine ring). Most preferably each T is independently H or $C_{1-4}$alkyl, especially H, $CH_3$ or $CH_3CH_2$, more especially H. Examples of cations which are IJP-effective comprise: +$NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

Compounds of Formula (1) may have many uses other than IJP. For example as well as colorants for IJP inks, compounds of the present invention may be used as intermediates in the preparation and/or purification of other compounds of Formula (1) and/or as research tools and/or diagnostic aids in relation to IJP.

The term 'colorant' as used herein includes both dyes and pigments. Colorants are not limited to materials which solely provide colour in the visible region of the electromagnetic (EM) spectrum but include materials (which may be visibly colouriess or weakly coloured) which attenuate radiation in other regions of the EM spectrum invisible to the naked eye [e.g. ultra-violet (UV) and/or infra-red (IR) absorbers]. Compounds of the present invention may exhibit such colorant properties outside the visible region.

Compounds of Formula (1) may be prepared by the methods described below and by other suitable methods analogous to those described in the art for similar phthalocyanine compounds. A preferred method for preparing one or more compounds of Formula (1) comprises the following steps:

(i) condensing one or more compounds of Formula (3)

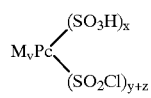

Formula (3)

with ammonia and an amine of formula $NHR^1R^2$;
(ii) treating the adduct from step (i) with a base, to produce one or more compounds of Formula (1);
where v, x, y, z, M, Pc, $R^1$ and $R^2$ are as represented herein.

Preferably in step (i) the ammonia and amine are present respectively in approximately y and z molar equivalents to the amount of phthalocyanine.

Preferably in step (ii) the base comprises sodium hydroxide and the pH of the mixture may be adjusted to be from 7.0 to 9.0, preferably 8.0.

Compounds of Formula (3) may be prepared using known methods. A preferred method preparing these compounds comprises heating (preferably for about 1 to about 24 hours), a metal-free or metal containing phthalocyanine (optionally comprising an average of two to four sulpho groups per molecule) with chlorosulphonic acid, preferably at a temperature above 60° C., more preferably above 100° C., most preferably from 120° C. to 165° C. Optionally this may be followed cooling, preferably to a temperature from 30° C. to 50° C. The phthalocyanine is then heated with $PCl_3$ (conveniently for about 4 to about 6 hours), preferably at lower temperature than with the chlorosulphonic acid, more preferably from 80° C. to 105° C.

The reactions leading to the formation of the present compounds may be performed under conditions that have been described in the art and compounds of Formula (1) may be isolated by known methods such as spray drying or precipitation followed by filtration.

In a further aspect of the present invention there is provided an ink which is effective for use in ink jet printing, the ink comprising a fluid medium, (optionally a liquid) and a colorant (preferably a dye) comprising one or more compounds of the present invention as defined herein.

Preferably the ink of the present invention comprises:
(a) from 0.01 to 30 parts of an IJP-effective compound of Formula (1); and
(b) from 70 to 99.99 parts of a liquid medium or a low melting point solid medium; wherein all parts are by weight and the number of parts of (a)+(b)=1 00.

The number of parts of component (a) is preferably from 0.1 to 20, more preferably from 0.5 to 15, and especially from I to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the colorant precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20. Preferably the organic solvent comprising the mixture of water and organic solvent is a water-miscible organic solvent or a mixture of such solvents. The liquid medium may comprise water and preferably two or more, more preferably from 2 to 8, water-soluble organic solvents.

Preferred water-miscible organic solvents comprise:
$C_{1-6}$-alkanols, preferably methanol, ethanol, n-propanol, isopropanol, n-butanol, sec-butanol, tert-butanol, n-pentanol, cyclopentanol and/or cyclohexanol;
linear amides, preferably dimethylformamide and/or dimethylacetamide, ketones and/or ketone-alcohols, preferably acetone, methyl ether ketone, cyclohexanone and/or diacetone alcohol;
water-miscible ethers, preferably tetrahydrofuran and/or dioxane;
diols, preferably $C_{2-12}$diols (for example pentane-1,5-diol, ethylene glycol, propylene glycol, butylene glycol, pentylene glycol, hexylene glycol and/or thiodiglycol) and/or oligo- and/or poly-alkyleneglycols (for example diethylene glycol, triethylene glycol, polyethylene glycol and/or polypropylene glycol);
triols, preferably glycerol and/or 1,2,6-hexanetriol;
$C_{1-4}$alkyl ethers of diols, preferably mono$C_{1-4}$alkyl ethers of $C_{2-12}$diols: {for example 2-methoxyethanol, 2-(2-methoxyethoxy)ethanol, 2-(2-ethoxyethoxy)-ethanol, 2-[2-(2-methoxyethoxy)ethoxy]-ethanol, 2-[2-(2-ethoxyethoxy)-ethoxy]-ethanol and/or ethyleneglycol monoallyl ether};
cyclic amides, preferably 2-pyrrolidone, N-methyl-2-pyrrolidone, N-ethyl-2-pyrrolidone, caprolactam and/or 1,3-dimethylimidazolidone;
cyclic esters, preferably caprolactone;
sulphoxides, preferably dimethyl sulphoxide and/or sulpholane; and/or
all IJP-effective mixtures thereof.

More preferred water-soluble organic solvents are selected from: cyclic amides (e.g. 2-pyrrolidone, N-methyl-pyrrolidone and N-ethyl-pyrrolidone); diols, (e.g. 1,5-pentane diol, ethyleneglycol, thiodiglycol, diethyleneglycol and triethyleneglycol);
$C_{1-4}$alkyl ethers of diols (e.g. 2-methoxy-2-ethoxy-2-ethoxyethanol); and
all IJP-effective mixtures thereof.

A preferred liquid medium comprises:
(a) from 75 to 95 parts water; and
(b) from 25 to 5 parts in total of one or more solvents selected from:
diethylene glycol, 2-pyrrolidone, thiodiglycol, N-methylpyrrolidone, cyclohexanol, caprolactone, caprolactam and pentane-1,5-diol;
where the parts are by weight and the sum of the parts (a)+(b)=100.

Another preferred liquid medium comprises:
(a) from 60 to 80 parts water;
(b) from 2 to 20 parts diethylene glycol; and
(c) from 0.5 to 20 parts in total of one or more solvents selected from:
2-pyrrolidone, N-methylpyrrolidone, cyclohexanol, caprolactone, caprolactam, pentane-1,5-diol and thiodiglycol;
where the parts are by weight and the sum of the parts (a)+(b)+(c)=100.

Examples of further IJP-effective media for inks of the present invention comprise a mixture of water and one or more organic solvents are described in US 4,963,189, U.S. Pat. No 4,703,113, U.S. Pat. No. 4,626,284 and EP 0425150-A.

When the liquid medium comprises an organic solvent free from water, (i.e. less than 1 % water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents comprise any of those described above and mixtures thereof. Preferred water-immiscible solvents comprise aliphatic hydrocarbons; esters (for example ethyl acetate) chlorinated hydrocarbons (for example dichloromethane), ethers (for example diethyl ether) and mixtures thereof.

When the liquid medium comprises a water-immiscible organic solvent, preferably it comprises a polar solvent (for example a $C_{1-4}$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$chains, and sulphonamides. The compound of Formula (1) may be dissolved in the low melting point solid or may be finely dispersed in it.

The ink may also contain additional components conventionally used in inks for IJP, for example viscosity and surface tension modifiers, corrosion inhibitors, biocides, kogation reducing additives and surfactants which may be ionic or non-ionic.

A further aspect of the invention provides a process for printing an image on a substrate comprising applying to the substrate by means of an ink jet printer, an ink of the present invention as defined herein.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir (e.g. by means of a resistor adjacent to the orifice) thereby causing the ink to be ejected in the form of small droplets directed towards the substrate during relative movement between the substrate and the orifice. In piezoelectric ink jet printers the oscillation of a small crystal causes ejection of the ink from the orifice.

A further aspect of the present invention provides a substrate which has applied thereon an ink of the present invention as defined herein and/or one or more compounds of the present invention as defined herein.

The substrate preferably comprises paper, plastic, a textile, metal or glass, more preferably paper, an overhead projector slide or a textile material, especially paper. Preferred papers are plain or treated papers which may have an acid, alkaline or neutral character.

Preferably the ink and/or compounds of the present invention have been applied to the substrate by a printed process, more preferably the process of the present invention as defined herein.

When the substrate is a textile material the ink according to the invention is preferably applied thereto by:
i) applying the ink to the textile material using an ink jet printer; and
ii) heating the printed textile material at a suitable temperature, preferably from 50° C. to 250° C., to fix the ink on the material.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in EP 0534660-A.

The invention is further illustrated by the following Examples in which all parts and percentages are by weight unless otherwise stated.

EXAMPLE 1

Preparation of

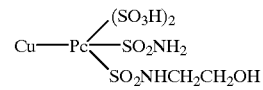

a) Preparation of

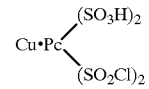

Copper phthalocyanine (115 g) was added in portions to stirred chlorosulphonic acid (308 ml) over 30 minutes keeping the temperature below 50° C. The mixture was stirred for 30 minutes before being heated gradually to 140° C., at which temperature it was stirred for 3 hours to obtain $CuPc(SO_3H)_4$.

The mixture was cooled to 40° C. and phosphorus trichloride (26.3 g) was added in portions over 30 minutes, whilst the temperature was kept below 50° C. The mixture was stirred overnight at room temperature and then cooled to 0° C. and poured onto a mixture of ice (700 g), water (700 g), concentrated hydrochloric acid (40 ml) and sodium chloride (100 g). The mixture was stirred at 0° C. for 30 minutes. The precipitated product was collected by filtration at reduced pressure and washed with ice-cold hydrochloric acid solution (0.5 M, 1.5 l) to obtain a paste of the above sulphonyl chloride.

(b) Preparation of title dye

Water (2.8 l), ethanolamine (16.6 g) and ammonia solution (48.6 g) were mixed in a 5 litre beaker and then placed in an ice bath (pH=11.53, temperature 8° C.). Sulphonyl chloride paste (862 g, prepared as described in step 1a above) was added to the mixture over 5 minutes and the reaction temperature rose to 10° C. Sodium hydroxide (165 mls 10% v/v) was added over 40 minutes to adjust the pH to 8.03. More NaOH (500 mls) was added to the mixture in aliquots over 30 minutes followed by a further 35 mls of NaOH to adjust the pH to 8.62. The pH of the mixture was maintained at 8.5 and the reaction mixture was stirred for five days. Sodium chloride (25% w/v) was added and the pH of the mixture was adjusted to 0.5 with concentrated hydrochloric acid. The resultant precipitate was collected by filtration at reduced pressure to obtain as the product the title dye which was characterised by HPLC and LC-MS (mlz 937, 873).

EXAMPLES 2 to 15

The following examples were prepared analogously to Example 1, above replacing the ethanolamine in step 1(c) above with the molar equivalent of the appropriate amine of formula $NHR^1R^2$.

| Example | —$R^1$ | —$R^2$ |
|---|---|---|
| 2 | —$C_2H_4OH$ | —$C_2H_4OH$ |
| 3 | —H | —$C_2H_4NHCH_2CO_2H$ |
| 4 | —H | —$C_2H_4NHC_2H_4SO_3H$ |
| 5 | —H | —$C_2H_4NHC_{16}H_{33}$ |
| 6 | 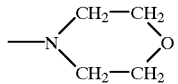 | |
| | $R^1$, $R^2$ & N together are | |
| 7 | —H | 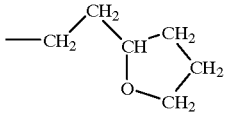 |
| 8 | —H | —$C_2H_4NHC_2H_4OH$ |
| 9 | —H | —$C_2H_4NHC_{12}H_{25}$ |
| 10 | —H | —$C_2H_4NHC_7H_{15}$ |
| 11 | —H | —$C_2H_4NHC(CH_3)_2CH_2C(CH_3)_3$ |
| 12 | —H | —$C_2H_4NHC_{10}H_{21}$ |
| 13 | —H | —$C_2H_4NHC_{14}H_{29}$ |
| 14 | —H | —$C_2H_4NHC_2H_4C(CH_3)_2C(CH_3)_3$ |
| 15 | —H | —$C_2H_4SC_{10}H_{21}$ |

Results

The aqueous ability of Example 1 was found to be 29%. This compares to an aqueous solubility of 14% for its mono-sulphonic acid substituted analogue. Contrary to what one would expect, the applicant has found that the improved water solubility of Example 1 (which equates to greater operability in IJP) does not occur at the expense of its water fastness (Wf). Prints made with the dyes of the Examples exhibit a WF comparable to the corresponding zero or mono-sulphonic acid dyes. These dyes also exhibit a particularly attractive cyan shade compared to their corresponding zero or mono- sulphonic acid analogues.

The dyes of the present invention are significantly easier than prior art dyes to formulate in IJP and use in IJP and yet they produce prints of comparable or improved quality to prior art dyes.

Salts

The exemplified sodium salts (examples 1 to 15) prepared as described above, may be used after suitable purification directly in ink formulations as described below or may be were converted to other IJP-effective salts as follows. Each example was dissolved in distilled water. The solution was filtered and the volume of the filtrate adjusted to 4 litres. The solution was desalinated by reverse osmosis. The dissolved sodium salt may be converted into other salt [e.g. the potassium salt] by passing the solution through an ion-exchange column comprising Dowex HGRW resin saturated with a suitable solution [e.g. potassium hydroxide solution (5% w/v)]. The solution of the (e.g. potassium) salt thus obtained was then filtered and water was evaporated form the filtrate to yield a purified salt suitable for use directly in an ink as described below.

Inks

The effectiveness in ink jet printing of compounds of Formula (1) was demonstrated as follows. Inks separately comprising each exemplified dye were prepared by dissolving 2 parts of the sodium salt, prepared as described above, in 98 parts of a mixture of water and 2-pyrrolidone (in a respective ratio of 90:10 by volume). The inks were printed onto plain paper (obtained from Felix Schoeller) using a thermal ink-jet printer to give a bright cyan prints which had excellent light fastness.

Further inks comprising the exemplified dyes may be may be prepared as described in the following tables in which the number in the first column (headed Ex. no.) denotes the example number of dye to be used in the ink. The dye may be in its free acid form and/or in the form of any IJP-effective salt (e.g. sodium, potassium, ammonium, or QAC salt). Numbers quoted in the second column onwards refer to the number of parts of the relevant ingredient and all parts are by weight. The inks may be applied to paper by thermal or piezo ink jet printing.

The following abbreviations are used in the tables:

PG=propylene glycol; DEG=diethylene glycol; NMP=N-methyl pyrollidone;

DMK=dimethylketone; NaST=Na stearate IPA=isopropanol;

MEOH=methanol; 2P=2-pyrrolidone; MIBK=methylisobutyl ketone;

CET=cetyl ammonium bromide; TBT=tertiary butanol; TDG=thiodiglycol;

BDL=butane-2,3-diol; PHO=$Na_2HPO_4$; P12=propane-1, 2-diol.

CHL=cyclohexanol; and PDL=pentan-1,5-diol.

TABLE I

| Ex. no. | Dye | Water | PG | DEG | NMP | DMK | MEOH | 2P | MIBK |
|---|---|---|---|---|---|---|---|---|---|
| 1 | 2.0 | 80 | 5 | | 6 | 4 | | 5 | |
| 2 | 10.0 | 85 | 3 | | 3 | 3 | 5 | 1 | |
| 3 | 2.1 | 91 | | 8 | | | | | 1 |
| 4 | 2.4 | 75 | 3 | 4 | | 5 | 6 | | 5 |
| 5 | 5.1 | 96 | | | | 4 | | | |
| 6 | 1.8 | 80 | | 5 | | | | 15 | |
| 7 | 2.6 | 84 | | | 11 | | | 5 | |
| 8 | 3.3 | 80 | 2 | | | 10 | 2 | | 6 |
| 9 | 5.4 | 69 | 2 | 20 | 2 | 1 | | 3 | 3 |
| 10 | 7.0 | 70 | | | 15 | | 3 | | 10 |

TABLE II

| Ex. No. | Dye | Water | PG | DEG | NMP | NaOH | Na ST | IPA | 2P | MIBK |
|---|---|---|---|---|---|---|---|---|---|---|
| 11 | 2.0 | 70 |   | 7 |   | 6 |   | 3 |   | 2 |
| 12 | 4.0 | 65 | 4 |   | 6 |   | 0.7 |   | 5 |   |
| 13 | 1.0 | 50 |   | 4 |   |   |   |   | 5 | 1 |
| 14 | 3.1 | 86 | 5 |   |   | 2 | 0.2 | 4 |   | 5 |
| 15 | 1.1 | 81 |   | 2 | 9 | 0.5 | 0.5 |   | 9 |   |

TABLE III

| Ex. no. | Dye | Water | PG | DEG | NMP | DMK | IPA | MEOH | 2P | MIBK |
|---|---|---|---|---|---|---|---|---|---|---|
| 1 | 3.1 | 86 | 5 |   |   |   | 4 |   |   | 5 |
| 2 | 1.1 | 81 |   |   | 9 |   |   |   | 9 |   |
| 3 | 2.5 | 60 | 4 | 15 | 3 | 3 | 6 | 10 | 5 | 4 |
| 4 | 3.2 | 65 |   | 5 | 4 | 6 | 5 | 4 | 6 | 5 |
| 5 | 10.0 | 80 | 2 | 6 | 2 | 5 | 1 |   | 4 |   |

TABLE IV

| Ex. no. | Dye | Water | PG | DEG | NMP | DMK | NaOH | Na ST | IPA |
|---|---|---|---|---|---|---|---|---|---|
| 6 | 3.0 | 90 |   | 5 | 5 |   | 0.2 |   |   |
| 7 | 5 | 65 | 5 | 20 |   |   |   |   | 10 |
| 8 | 4.1 | 80 |   | 5 | 2 | 10 |   | 0.3 |   |
| 9 | 10.8 | 90 | 5 |   |   |   |   |   | 5 |
| 10 | 12.0 | 90 |   |   |   | 7 | 0.3 |   | 3 |

TABLE V

| Ex. no. | Dye | Water | PG | DEG | NMP | CET | PHO | 2P | P12 |
|---|---|---|---|---|---|---|---|---|---|
| 11 | 3.0 | 80 | 15 |   |   | 0.2 |   | 5 |   |
| 12 | 9.0 | 90 |   | 5 |   |   | 1.2 |   | 5 |
| 13 | 2.5 | 90 |   | 6 | 4 |   | 0.12 |   |   |
| 14 | 3.1 | 82 | 4 | 8 |   | 0.3 |   |   | 6 |
| 15 | 10.0 | 91 |   |   | 6 |   |   | 3 |   |
| 1 | 5.0 | 78 | 5 | 11 |   |   |   | 6 |   |
| 2 | 6.0 | 63 | 3 |   | 4 |   | 2.0 |   |   |
| 3 | 3.0 | 72 |   | 15 |   | 0.8 |   |   | 3 |
| 4 | 5.4 | 86 | 5 |   | 7 |   | 3.0 | 7 |   |
| 5 | 2.0 | 90 |   |   | 10 |   |   |   | 10 |

TABLE VI

| Ex. no. | Dye | Water | PG | DEG | NMP | CET | TBT | TDG |
|---|---|---|---|---|---|---|---|---|
| 6 | 1.5 | 85 | 5 | 5 |   | 0.15 | 5.0 | 0.2 |
| 7 | 9.0 | 90 |   | 5 | 5 |   |   | 0.3 |
| 8 | 2.0 | 90 |   | 10 |   |   |   |   |
| 9 | 2.0 | 88 |   |   |   |   |   | 10 |
| 10 | 5.5 | 70 | 4 |   | 4 | 0.4 | 3 |   |

TABLE VII

| Ex. no. | Dye | Water | PG | DEG | NMP | TBT | TDG | BDL | PHO | 2P |
|---|---|---|---|---|---|---|---|---|---|---|
| 11 | 0.9 | 85 |   | 10 |   |   |   | 5 | 0.2 |   |
| 12 | 4.0 | 70 |   | 10 | 4 |   |   | 1 |   | 4 |
| 13 | 2.2 | 75 | 4 | 10 | 3 |   |   | 2 |   | 6 |
| 14 | 9.0 | 76 |   | 9 | 7 | 3.0 |   |   | 0.95 | 5 |
| 15 | 2.1 | 70 | 5 | 5 | 5 | 0.2 | 0.1 | 5 | 0.1 | 5 |

TABLE VIII

| Ex. no. | Dye | Water | PG | DEG | NMP | TBT | TDG | 2P |
|---|---|---|---|---|---|---|---|---|
| 1 | 3.0 | 55 |   |   |   | 5 | 2.0 | 3 |
| 2 | 6.0 | 65 |   | 4 |   |   | 0.1 | 5 |
| 3 | 5.0 | 78 |   |   | 5 |   | 12 | 5 |
| 4 | 8.0 | 70 | 2 |   | 8 |   | 15 | 5 |
| 5 | 10.0 | 80 |   |   |   |   | 8 | 12 |

TABLE IX

| Ex. no. | Dye | Water | PG | DEG | NMP | BDL | PHO | 2P | P12 |
|---|---|---|---|---|---|---|---|---|---|
| 6 | 10.0 | 75 | 3 |   | 5 | 3 |   | 3 | 1 |
| 7 | 3.5 | 80 |   | 6 |   |   |   |   | 5 |
| 8 | 2.0 | 90 | 7 |   |   | 7 | 0.5 |   |   |
| 9 | 6.0 | 65 |   |   | 5 |   |   | 2 |   |
| 10 | 4.0 | 70 |   | 10 | 4 | 1 |   | 4 | 11 |

TABLE X

| Ex. no. | Dye | Water | PG | DEG | NMP | CET | TBT | TDG | BDL | PHO | 2P |
|---|---|---|---|---|---|---|---|---|---|---|---|
| 11 | 1.5 | 80 | 1 | 2 | 3 | 0.5 | 0.4 |   | 7 | 2 | 10 |
| 12 | 3.0 | 60 |   | 4 |   | 2.0 |   | 0.5 |   |   |   |
| 13 | 4.5 | 90 |   | 3 | 6 |   | 7.0 |   | 1 | 3 | 2 |

TABLE X-continued

| Ex. no. | Dye | Water | PG | DEG | NMP | CET | TBT | TDG | BDL | PHO | 2P |
|---|---|---|---|---|---|---|---|---|---|---|---|
| 14 | 3.0 | 95 |  | 7 |  | 4 |  | 3 |  | 0.5 |  |
| 15 | 2.1 | 70 | 5 | 5 | 5 | 0.1 | 0.2 | 0.1 | 5 | 0.1 | 5 |

TABLE XI

| Ex. no. | Dye | Water | PG | DEG | NMP | CHL | PHO | 2P | PDL |
|---|---|---|---|---|---|---|---|---|---|
| 1 | 7.0 | 75 | 3 |  | 5 | 3 |  | 3 | 1 |
| 2 | 3.5 | 60 |  |  | 2 |  |  |  | 5 |
| 3 | 2.0 | 90 | 7 |  |  | 7 | 1.5 |  | 2 |
| 4 | 6.0 | 65 |  |  | 5 |  |  | 2 |  |
| 5 | 4.0 | 70 |  | 5 | 4 | 1 |  | 4 | 12 |

What is claimed is:

1. One or more compounds of Formula (1) and salts thereof:

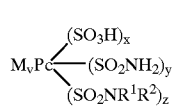

Formula (1)

in which:
M represents a metal or H;
Pc represents a phthalocyanine nucleus; and
$R^1$ represents H or $-(CH_2)_nR^3$; $R^2$ represents $-(CH_2)_n R^3$; or $R^1$ and $R^2$ together with the nitrogen atom to which they are attached represent a 5 or 6-membered ring; where:
n is independently an integer from 1 to 30; and
$R^3$ is independently selected from the grout consisting of H, hydroxy, sulpho, cyano, $-SR^4$, $-CO_2R^5$, $-PO_3H_2$ and $-NR^6R^7$; where:
$R^4$, $R^5$, $R^6$ and $R^7$ independently represent H, $C_{1-30}$alkyl optionally substituted by one or more groups selected from the group consisting of hydroxy, mercapto, sulpho, carboxy, cyano and $-PO_3H_2$;
v is the valence of Pc divided by the valence of M;
x is from 1.2 to 3.8;
y is from 0.1 to 2.7;
z is from 0.1 to 2.7; and
x, y and z satisfy $2 \leq x+y+z \leq 4$;
with the provisos that:
$R^4$ and $R^5$ are other than both H;
when $R^1$ is H or $C_{1-4}$alkyl then $R^4$ is other than $C_{1-4}$alkyleneSO$_3$H;
when $R^1$ is H or $C_{1-4}$alkyl and $R^6$ is H, $C_{1-4}$alkyl or hydroxyC$_{1-4}$alkyl; then $R^7$ is other than $C_{1-4}$alkyl or hydroxyC$_{1-4}$alkyl; and
when $R^1$ is H or $C_{1-4}$alkyl then $R^6$ and $R^7$ are other than both H.

2. One or more phthalocyanine compounds according to claim 1 wherein M is Cu or Ni, $R^1$ is selected from the group consisting of H and optionally substituted $C_{1-15}$alkyl and $R^2$ is a substituted $C_{1-15}$alkyl.

3. An ink which is effective for use in ink jet printing, the ink comprising a fluid medium and a colorant comprising one or more compounds of Formula (1) as claimed in either claim 1 or 2.

4. A process for printing an image on a substrate comprising applying to the substrate by means of an ink jet printer, an ink as claimed in claim 3.

5. A substrate which has applied thereon, an ink as claimed in claim 3.

6. One or more compounds according to claim 1 wherein M is Cu, $R^1$ is selected from the group consisting of H, $C_{1-4}$alkyl and hydroxyC$_{1-4}$alkyl and $R^2$ is a hydroxyC$_{1-4}$alkyl.

7. One or more compounds according to claim 1 wherein x is 1.5 to 2.5.

8. One or more compounds according to claim 1 wherein x is 1.8 to 2.2.

9. One or more compounds according to claim 1 wherein y and z are independently from 0.5 to 1.5.

10. One or more compounds according to claim 1 wherein x is 2 and y and z are each 1.

11. One or more compounds according to claim 1 wherein the salts of Formulae (1) comprise alkali metal salts.

12. One or more compounds according to claim 1 wherein the salts of Formulae (1) comprise optionally substituted ammonium salts.

13. One or more compounds according to claim 1 wherein the salts of Formulae (1) are those with a cation of formula $^+NT_4$ where each T is independently H or optionally substituted alkyl, or two groups represented by T are H or optionally substituted alkyl and the remaining two groups represented by T, together with the N atom to which they are attached, form a 5 or 6 membered ring.

14. One or more compounds according to claim 1 wherein the salts of Formulae (1) comprise at least one of: $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H3$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

15. An ink according to claim 3 wherein the fluid medium comprises water or a mixture of water and a organic solvent.

16. An ink according to claim 3 wherein the fluid medium comprises water and a water-miscible organic solvent or a mixture of such solvents.

17. An ink according to claim 3 wherein the fluid medium comprises an organic solvent free from water.

18. An ink according to claim 3 comprising:
(a) from 75 to 95 parts water; and
(b) from 25 to 5 parts in total of one or more solvents selected from the group consisting of:
diethylene glycol, 2-pyrrolidone, thiodiglycol, N-methylpyrrolidone, cyclohexanol, caprolactone, caprolactam and pentane-1,5-diol;

where the parts are by weight and the sum of the parts (a)+(b)=100.

19. An ink according to claim 3 comprising:

(a) from 60 to 80 parts water;

(b) from 2 to 20 parts diethylene glycol; and (c) from 0.5 to 20 parts in total of one or more solvents selected from the group consisting of: 2-pyrrolidone, N-methylpyrrolidone, cyclohexanol, caprolactone, caprolactam, pentane-1,5-diol and thiodiglycol;

where the parts are by weight and the sum of the parts (a)+(b)+(c)=100.

* * * * *